Patented July 18, 1939

2,166,117

UNITED STATES PATENT OFFICE 2,166,117

METHOD FOR THE PURIFICATION OF PETROLEUM MAHOGANY SULPHONATES

Manuel Blumer, Butler, Pa., assignor to L. Sonneborn Sons, Inc., a corporation of Delaware No Drawing. Application January 19, 1937, Serial No. 121,288

12 Claims. (Cl. 260—504)

This invention relates to a new and useful method for the purification of petroleum mahogany sulphonates.

The conventional refining treatment of certain lubricating oil distillates derived from petroleum includes the application of fuming sulphuric acid. This reacts with the oil, producing a black sludge containing unreacted sulphuric acid and certain types of sulphonic acids. Though the concentration of $SO_3$ in the fuming acid may vary considerably, a 20% fuming acid is employed in the majority of cases. As a result of the high degree of sulphonation obtained in the acid treatment, a considerable amount of sulphonic acids is produced. These are principally of two types, that is, the so-called water-soluble type predominantly contained in the sludge and the so-called oil-soluble type predominantly found in the oil to the extent of a few percent. The acid application is regulated in the manner well known in the art to produce the desired sulphonation reaction and in general temperatures not exceeding 140° F. are preferred. The acids contained in the sludge, while limitedly soluble, if at all, in hydrocarbon oils, are highly water-soluble, imparting to their aqueous solution a dark-green color, and being for this reason generally referred to as "green petroleum sulphonic acids". The acids left in solution in the oil impart a reddish color to the oil and for this reason are generally referred to as "mahogany petroleum sulphonic acids". After the separation of the oil from the acid sludge the mahogany sulphonic acids are usually recovered from the oil in the form of their salts in accordance with ordinary refining methods comprising conversion of the acids into salts by direct neutralization of the acid treated oil followed by suitable extraction. These salts or mahogany sulphonates constitute a valuable by-product of petroleum refining, being used for a variety of purposes but primarily as emulsifying agents.

The mahogany sulphonic acids or mahogany sulphonates constitute a material well defined in its character and properties though as yet unknown in its composition. It is assumed to comprise a series of closely related sulphonic acids or sulphonates as the case may be with a varying number of sulpho groups. Inasmuch, however, as the material obtained in the refining of petroleum oils is substantially uniform and well identifiable I have termed and will refer to the neutralized sulphonic acids for the purpose of brevity simply as "mahogany sulphonate" or "mahogany sulphonates".

One object of my invention comprises inter alia the removal of inorganic salts from crude mahogany sulphonate stock as it is customarily obtained in the acid treatment of petroleum distillates and containing varying amounts of entrained oil. The oil content of such crude stock is usually up to 40% or more, while the inorganic salts, particularly sulphates and sulphites, are as a rule present in amounts of approximately 9% or higher. For many purposes it is not only desirable but requisite to substantially remove these admixed inorganic salts from the mahogany sulphonate stock. The removal of the entrained oil, in the majority of cases, is not necessary and its presence is in some instances even desirable.

I have discovered that a mahogany sulphonate stock containing entrained oil can be obtained in a substantially pure condition from crude mahogany sulphonate stock by the use of butyl alcohol in the presence of water. In the practical application of my method the crude mahogany sulphonate stock containing entrained oil is contacted with the butyl alcohol and a certain amount of water as thoroughly as possible and preferably with the aid of agitation; though not necessary it is of advantage thereafter to heat the resulting mix to from 120° to 130° F. for the purpose of facilitating the removal of the inorganic salts from the mahogany sulphonate stock. The free alkali is then neutralized and the neutralized mix left to settle until two layers have formed. The upper or oily layer is primarily composed of mahogany sulphonate, oil and butyl alcohol, whereas the lower or aqueous layer comprises predominantly an aqueous salt solution. Thus, the inorganic salts originally present in the crude mahogany sulphonate stock are taken up and removed by the water.

After the separation of the aqueous layer from the oily layer the butyl alcohol is removed from the mahogany sulphonate stock by distillation and may thus be recovered for re-use. After the alcohol has been flashed off, the mahogany sulphonate stock is obtained substantially pure, that is, substantially free from inorganic salts in excess of 3% and in most instances in excess of 1%, which in the majority of cases is sufficiently pure for commercial purposes.

In accordance with my invention it is of advantage to control the pH of the mix and I have found that if the pH appreciably exceeds 9 (being on the alkaline side) it is highly difficult in large scale operations and frequently impossible to obtain a product substantially free from inorganic salts content in excess of 3%, whereas a pH of 9 or below 9 and above 3 and preferably a pH of 7 or between 7 and 3 yields a substantially pure end product. This becomes of particular importance with regard to the extent of neutralization with a suitable acid to which the mahogany sulphonate stock must be subjected for the successful purification, should it possess too high a degree of alkalinity, which is usually the case as the result of the free alkali normally present therein. A neutralization with phenol phthalein as indicator will show a neutral point at a pH of approximately 7.5 to 8 and sometimes even as high as 9. If methyl red or methyl orange are used as indicator the end point of the neutralization appears at a pH of 6 to 7 or of 3 to 4 respectively. A neutralization with the last mentioned indicators therefore will be preferable as yielding a product of still less salt content than the final product obtained when the neutralization has been effected to the phenol phthalein end point.

A further advantage of the control of the pH within the indicated limits resides in the fact that it accelerates the speed with which the inorganic salts will be removed and the mix will stratify into layers. Within the range of pH specified this separation is considerably faster than at higher pH ranges.

Concerning the proportions of butyl alcohol and water that I may use in accordance with my invention for the removal of the inorganic salts from a mahogany sulphonate stock containing entrained oil, I have found that satisfactory results can be obtained by maintaining a ratio of mahogany sulphonate stock plus entrained oil to butyl alcohol in excess of 0.5 and preferably between 2.0 and 3.0, a ratio of mahogany sulphonate stock plus entrained oil to water in excess of 0.5 and preferably between 1.5 and 6.0 and a ratio of butyl alcohol to water in excess of 0.5 and preferably between 0.8 and 4.0. For economical reasons, however, I prefer to use such proportions within the defined limits as will permit the greatest concentration of mahogany sulphonate stock plus entrained oil and the least amount of alcohol, and have found it of advantage to utilize a ratio of mahogany sulphonate stock plus entrained oil to butyl alcohol of 2, a ratio of mahogany sulphonate stock plus entrained oil to water of 2 and a ratio of butyl alcohol to water of 1 which in percentage proportions is equivalent to 50% mahogany sulphonate stock, plus entrained oil, 25% butyl alcohol and 25% water.

It is of course understood and within the purview of my invention that I may use the isomers of butyl alcohol, such as secondary and tertiary butyl alcohol and wherever I use the term butyl alcohol in the specification and claims I mean to include such isomers.

Though I prefer to neutralize the alkalinity present in the mahogany sulphonate stock after the addition of the alcohol and water, I may effectuate this neutralization before such addition and circumstances as well as particular practices may sometimes require this deviation from the preferred procedure.

The foregoing description is by way of illustration and not of limitation and I am not to be limited to any details but only by the appended claims in which I have endeavored to claim broadly all inherent novelty.

I claim:

1. Method of purifying petroleum mahogany sulphonates containing entrained oil and inorganic salts which comprises contacting said impure sulphonates with a butyl alcohol and water in amount and ratio sufficient to thereby form a first liquid layer substantially free from inorganic salts and consisting predominantly of butyl alcohol and mahogany sulphonate plus entrained oil and a second liquid layer consisting predominantly of an aqueous solution of said inorganic salts, thereafter separating said first liquid layer from said second liquid layer and finally removing said butyl alcohol from said first liquid layer and recovering mahogany sulphonate plus entrained oil substantially free from inorganic salts.

2. Method of purifying petroleum mahogany sulphonates containing entrained oil and inorganic salts which comprises contacting said impure sulphonates with a butyl alcohol and water while substantially maintaining a pH range between 3.0 and 9.0, said butyl alcohol and said water being present in amount and ratio sufficient to thereby yield a first liquid layer substantially free from inorganic salts and consisting predominantly of butyl alcohol and mahogany sulphonate plus entrained oil and a second liquid layer consisting predominantly of an aqueous solution of said inorganic salts, thereafter separating said first liquid layer from said second liquid layer and finally removing said butyl alcohol from said first liquid layer and recovering mahogany sulphonate plus entrained oil substantially free from inorganic salts.

3. Method in accordance with claim 2 in which said pH range is substantially maintained between 3.0 and 7.0.

4. Method of purifying petroleum mahogany sulphonates containing entrained oil and inorganic salts which comprises contacting said impure sulphonates with a butyl alcohol and water, substantially maintaining a ratio of mahogany sulphonate containing entrained oil and inorganic salts to butyl alcohol between 2 and 3, to water between 1.5 and 6 and a ratio of butyl alcohol to water between 0.8 and 4.0, to thereby form a first liquid layer substantially free from inorganic salts and consisting predominantly of butyl alcohol and mahogany sulphonate plus entrained oil and a second liquid layer consisting predominantly of an aqueous solution of said inorganic salts, thereafter separating said first liquid layer from said second liquid layer and finally removing said butyl alcohol from said first liquid layer and recovering mahogany sulphonate plus entrained oil substantially free from inorganic salts.

5. Method of purifying petroleum mahogany sulphonates containing entrained oil and inorganic salts which comprises contacting said impure sulphonates with a butyl alcohol and water while substantially maintaining a pH range between 3.0 and 9.0, and a ratio of mahogany sulphonate containing entrained oil and inorganic salts to butyl alcohol between 2 and 3, to water between 1.5 and 6 and a ratio of butyl alcohol to water between 0.8 and 4.0, to thereby form a first liquid layer substantially free from inorganic salts and consisting predominantly of butyl alcohol and mahogany sulphonate plus entrained oil and a second liquid layer consisting predominantly of an aqueous solution of said inorganic salts, thereafter separating said first liquid layer from said second liquid layer and finally removing said butyl alcohol from said first liquid layer and recovering mahogany sulphonate plus entrained oil substantially free from inorganic salts.

6. Method in accordance with claim 5 in which the pH range is substantially maintained between 3 and 7 and in which the ratio of mahogany sulphonate containing entrained oil and inorganic salts to butyl alcohol and to water is 2 and the ratio of butyl alcohol to water is 1.

7. Method of purifying petroleum mahogany sulphonates containing entrained oil and inorganic salts which comprises contacting said impure sulphonates with a butyl alcohol and water at a temperature of 120° to 130° F., said butyl alcohol and said water being present in amount and ratio sufficient to thereby yield a first liquid layer substantially free from inorganic salts and consisting predominantly of butyl alcohol and mahogany sulphonate plus entrained oil and a second liquid layer consisting predominantly of an aqueous solution of said inorganic salts, thereafter separating said first liquid layer from said second liquid layer and finally removing said butyl alcohol from said first liquid layer and recovering mahogany sulphonate plus entrained oil substantially free from inorganic salts.

8. Method of purifying petroleum mahogany sulphonates containing entrained oil and inorganic salts which comprises contacting said impure sulphonates with a butyl alcohol and water at a temperature of 120° to 130° F. while substantially maintaining a pH range between 3.0 and 9.0, said butyl alcohol and said water being present in amount and ratio sufficient to thereby yield a first liquid layer substantially free from inorganic salts and consisting predominantly of butyl alcohol and mahogany sulphonate plus entrained oil and a second liquid layer consisting predominantly of an aqueous solution of said inorganic salts, thereafter separating said first liquid layer from said second liquid layer and finally removing said butyl alcohol from said first liquid layer and recovering mahogany sulphonate plus entrained oil substantially free from inorganic salts.

9. Method in accordance with claim 8 in which said pH range is substantially maintained between 3.0 and 7.0.

10. Method of purifying petroleum mahogany sulphonates containing entrained oil and inorganic salts which comprises contacting said impure sulphonates with a butyl alcohol and water at a temperature of 120° to 130° F., substantially maintaining a ratio of mahogany sulphonate containing entrained oil and inorganic salts to butyl alcohol between 2 and 3, to water between 1.5 and 6 and a ratio of butyl alcohol to water between 0.8 and 4.0, to thereby form a first liquid layer substantially free from inorganic salts and consisting predominantly of butyl alcohol and mahogany sulphonate plus entrained oil and a second liquid layer consisting predominantly of an aqueous solution of said inorganic salts, thereafter separating said first liquid layer from said second liquid layer and finally removing said butyl alcohol from said first liquid layer and recovering mahogany sulphonate plus entrained oil substantially free from inorganic salts.

11. Method of purifying petroleum mahogany sulphonates containing entrained oil and inorganic salts which comprises contacting said impure sulphonates with a butyl alcohol and water at a temperature of 120° to 130° F. while substantially maintaining a pH range between 3.0 and 9.0, and a ratio of mahogany sulphonate containing entrained oil and inorganic salts to butyl alcohol between 2 and 3, to water between 1.5 and 6 and a ratio of butyl alcohol to water between 0.8 and 4.0, to thereby form a first liquid layer substantially free from inorganic salts and consisting predominantly of butyl alcohol and mahogany sulphonate plus entrained oil and a second liquid layer consisting predominantly of an aqueous solution of said inorganic salts, thereafter separating said first liquid layer from said second liquid layer and finally removing said butyl alcohol from said first liquid layer and recovering mahogany sulphonate plus entrained oil substantially free from inorganic salts.

12. Method in accordance with claim 11 in which the pH range is substantially maintained between 3 and 7 and in which the ratio of mahogany sulphonate containing entrained oil and inorganic salts to butyl alcohol and to water is 2 and the ratio of butyl alcohol to water is 1.

MANUEL BLUMER.